United States Patent [19]

Marschall

[11] Patent Number: 4,965,773
[45] Date of Patent: Oct. 23, 1990

[54] METHOD FOR RECORDING SEISMIC DATA

[75] Inventor: Roland Marschall, Hanover, Fed. Rep. of Germany

[73] Assignee: Prakla-Seismos AG, Hanover, Fed. Rep. of Germany

[21] Appl. No.: 282,134

[22] Filed: Dec. 9, 1988

[30] Foreign Application Priority Data

Dec. 9, 1987 [DE] Fed. Rep. of Germany ....... 3742147
Dec. 12, 1987 [DE] Fed. Rep. of Germany ....... 3742528

[51] Int. Cl.$^5$ .............................................. G01V 1/38
[52] U.S. Cl. ...................................... 367/15; 181/110
[58] Field of Search ....................... 367/15, 20, 72, 16; 181/110, 112

[56] References Cited

U.S. PATENT DOCUMENTS 4,486,863 12/1984 French .................................. 367/15
4,894,807 1/1990 Alam et al. ........................... 367/15

OTHER PUBLICATIONS

"Prakla—Seismos Information No. 43", *Streamer Position for 3—D Surveys,* pp. 1-12, Publ. Aug., 1983.
Dr. Helmut Weichart, "Forschunsgschiff Prospekta-vollgepackt mit Elekftonik", published in Funkschau, Apr. 1971.
"Prakls—Seismos Information No. 46", *Streamer Positioning and Coverage Control,* 1984, pp. 1-20.

*Primary Examiner*—Ian J. Lobo
*Attorney, Agent, or Firm*—Walter C. Farley

[57] ABSTRACT

A procedure for surveying the seismic data of a region comprising a central body or structure, for instance an island, by means of a ship-towed streamer, wherein the ship follows a spiral path (2) around the central structure (1) to collected seismic data. Preferably the spiral is an Archimedean spiral with equidistant individual spiral line segments (7, 8, 9).

5 Claims, 1 Drawing Sheet

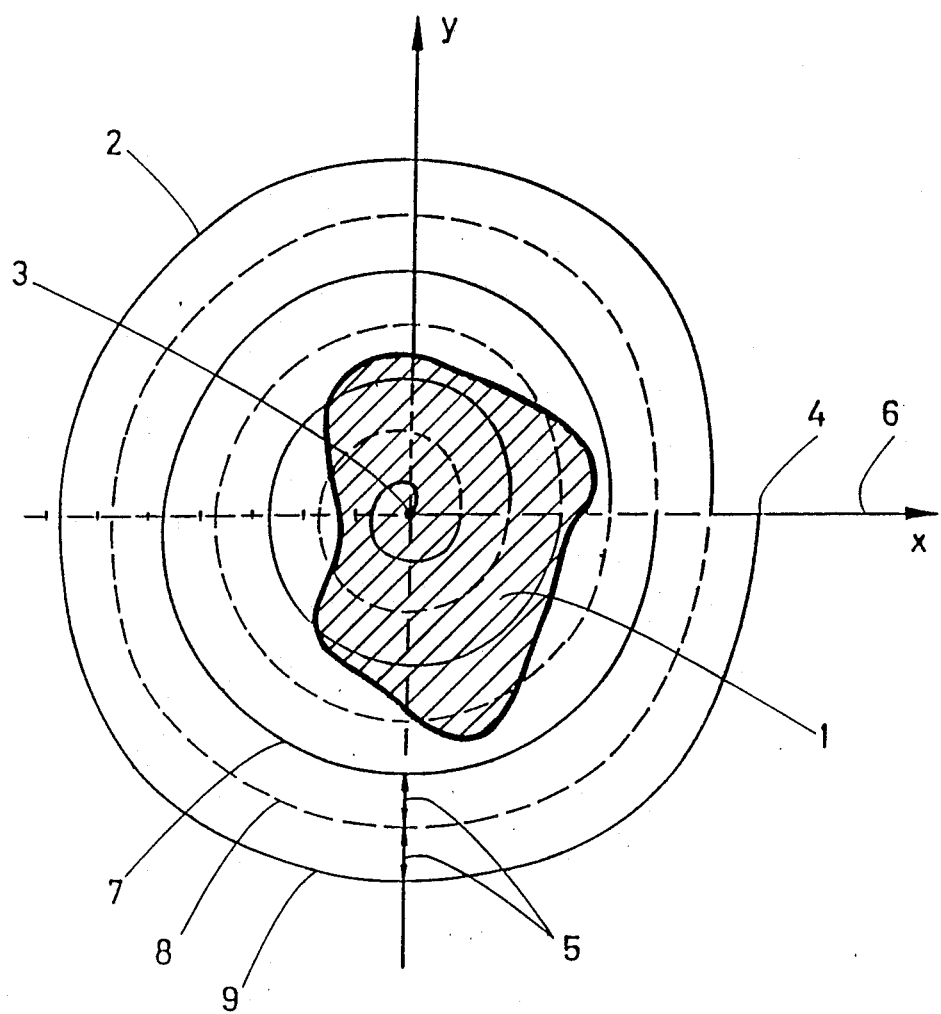

METHOD FOR RECORDING SEISMIC DATA

The invention concerns a procedure for recording seismic data of a marine region having therein a central body or structure.

BACKGROUND OF THE INVENTION

Presently marine-seismic data are gathered and recorded essentially by means of ship-towed streamers. Preferably, the ship moves in parallel paths over the region to be surveyed. At the ends of the paths, the ship can be turned around and moved in the reverse direction parallel to and a distance from the previous path over the region being surveyed.

The course reversals at the ends of the paths are time-consuming and therefore expensive, and furthermore no data can be collected during the reversing time.

A number of different path patterns have been suggested to avoid the path reversals, whereby the reversal lengths are shortened. U.S. Pat. No. 4,486,863 discloses a method wherein a streamer is moved over the region being investigated along circles offset along an advancing line. The towing ship moves along circular paths and the streamer follows this path relatively precisely. To get from one circle to the next, the moment its course is parallel to the direction of advance of the circles to be covered, the ship leaves tangentially the already surveyed circle and again tangentially moves onto the next one, which then is again traversed completely, etc.

The above method is suitable only for surveying a large, continuous and uninterrupted region and allows avoiding reversal paths that do not contribute to data collection.

The "areal seismology" discussed above is no longer readily suitable when obstacles such as islands prevent surveying a continuous surface. It is precisely the immediate surroundings of a very small island which may be especially significant seismology. As will be recognized, the term "surveying" as used herein involves the process of transmitting sound energy, receiving energy reflected from subsurface formations and recording that information. It can, and often does, include processing of the collected data.

SUMMARY OF THE INVENTION

In the light of the above state of the art, an object of the present invention is to create a procedure for collecting and recording the seismic data of a region which includes a central structure and making possible data-collecting suitable to the structure and simple analysis of said collected data, where this procedure can be carried out in a simple manner without having to move over paths which do not contribute to the desired data-volume.

Briefly described, the invention includes a method of gathering and mapping seismic data of a marine region which contains a stationary body comprising the steps of defining a spiral path using a point on the body as the origin of the spiral, and towing a transmitter/receiver streamer along the spiral path to gather seismic data.

The invention is especially well suited to data collection around the central structures of an object such as small islands, salt fingers present in the substratum of similar point-like structures. The data-collection is essentially polar in that a spiral path is followed, whereby, for three-dimensional surveying and starting from the central structure, vertical sections can be obtained in any desired azimuthal direction. In this manner high data density can be obtained for the central structure, which otherwise could not be achieved.

A preferred implementation of the invention calls for a spiral path for which the radial distance between the spiral turns is constant as given by an Archimedean spiral.

BRIEF DESCRIPTION OF THE DRAWING

In order to impart full understanding of the manner in which these and other objects are attained in accordance with the invention, a particularly advantageous embodiment thereof will be described with reference to the accompanying drawing, which forms a part of this specification, and wherein the FIGURE shows a region at sea with a central structure such as an island the slope-structure of which is to be surveyed.

DESCRIPTION OF THE PREFERRED EMBODIMENT

In some marine areas there are structures such as small islands or finger-like projections from lower substratum layers. Areal surveying using conventional streamers is possible only if the structures do not project above sea level. A three-dimensional data-volume prepared in that manner allows constructing vertical, i.e., radial sections starting at the structure, however substantial computation is required. If the island emerges above sea level, adequate surveying of the slopes is not easily achievable using conventional techniques.

In the procedure of the invention, a spiral path is selected for the ship towing the streamer. Thereby the ship can be made to move from a starting point over a large surface to an end point without having to reverse paths.

Because the procedure of the invention is based on data collection while a path is followed around a structure, it is especially advantageous for central structures.

To avoid reversal paths and matching paths that are required when surveying circularly, the invention selects a spiral path in the form of an Archimedean spiral in a preferred embodiment of the invention. This Archimedean spiral is characterized by constant distances between adjacent spiral lines throughout. It can be thought of as being formed in segments wherein each segment occupies 360° (2) and increases in radius from the origin by the same amount each time around. When considering a radial line starting from the structure, its intersections with the spiral line therefore will be equidistant. This distribution applies to all radial lines.

In order to make those 360° segments easier to identify visually, they are drawn in the FIGURE in alternating solid and dashed lines. It will be seen that the first spiral segment (solid line) beginning at the origin 3 has an increasing radius r wherein $\leq r \leq 2a$ and where "a" is a constant. The second segment (dashed lines) has a radius $2a \leq r \leq 4a$; and the third segment $4a \leq r \leq 6a$. Thus the difference in radius between one segment and the next is 2a. In polar coordinates, the equation for the spiral is $R = ar$.

The arc length of the spiral can be shown to be $S = [a/z]r^2$ which is an important parameter for sampling because it defines the amount of data which can be acquired in the field. However, because the reflection characteristics are primarily transverse to the streamer path, the distance between two successive signals, measured along a radial line, defines the crossline sampling rate.

Using an Archimedean spiral offers the special advantage that, because of the constant distance between the spiral lines as seen along a radial line, the sampling rate transverse to the path is immediately given. Consequently, the ultimate three-dimensional analysis of the collected data makes it possible, in a relatively simple manner, to obtain horizontal sections in any azimuthal direction with respect to the origin of the spiral. This is especially significant where the examination bears on the slopes of the structure, especially when passing from the vertical to the horizontal (in particular with respect to the transition of a substratum to, e.g., a salt finger). Relative to the transition horizons, the spiral line employed represents a profile continuously surveyed with respect to the strike of these horizons. Accordingly, the corresponding stacking rates for the towed-over horizons no longer are slope-dependent.

The arcuate length of the spiral determines the number of grid points during one revolution of the streamer around the structure.

The FIGURE illustrates the principle of the invention. The origin of 2 of a spiral line 2 is placed approximately at the middle of a central structure 1, which, in the present example, is an island. Because an Archimedean spiral is used, the distances between the individual spiral line segments, for instance between segments 7, 8 and 9, are equidistant. Therefore the radial line 6 intersects the spiral line at equal distances 5 as far as the end point 4 of the spiral line 2.

The size of the structure 1 determines that seismic surveying using a towed streamer is possible only on the spiral line segments 7, 8 and 9.

Preferably the distance between the spiral lines is selected to be less than 50 m to achieve an adequately dense data collection. The end radius of the spiral line depends on the kind of surveyed structure, on the depth being investigated and on the radial spread of the structure in the sub-stratum.

The procedure of the invention allows rapid, accurate, high information content surveying of seismic data around a central structure.

REFERENCE NUMERALS

1: structure
2: spiral
3: center (origin)
4: end point
5: distance
6: radial line
7,8,9: spiral segment While one advantageous embodiment has been chosen to illustrate the invention, it will be understood by those skilled in the art that various changes and modifications can be made therein without departing from the scope of the invention as defined in the appended claims.

What is claimed is:

1. A method of gathering and mapping seismic data of a marine region of a type having a stationary body therein comprising the steps of
defining a spiral path using a point on the body as the origin of the spiral, and
towing a transmitter/receiver streamer along the spiral path to gather seismic data.

2. A method according to claim 1 wherein the step of defining includes determining the spiral path so that the distance along any radial line is constant from one spiral turn to the next.

3. A method according to claim 2 and further comprising constructing a three-dimensional data volume for the region surrounding the body.

4. A method according to claim 3 wherein radial sections starting from the central structure are derived from the three-dimensional data volume.

5. A method according to claim 1 and further comprising constructing a three-dimensional data volume for the region surrounding the body.

* * * * *